Sept. 19, 1944. J. BLOCK 2,358,556
INFUSER
Filed March 10, 1943
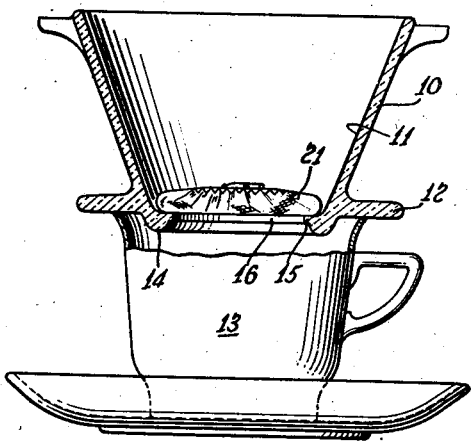
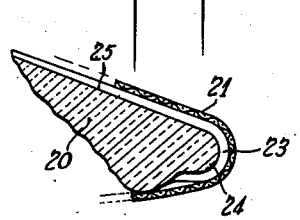
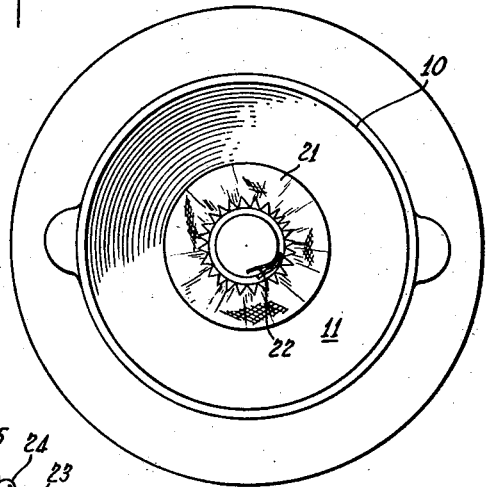
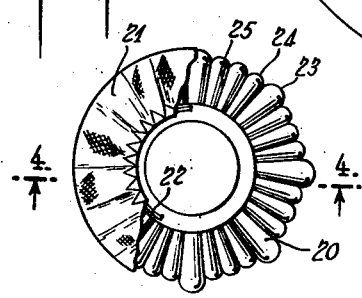
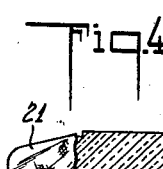
INVENTOR
JOSEPH BLOCK
BY
ATTORNEY.

Patented Sept. 19, 1944

2,358,556

UNITED STATES PATENT OFFICE 2,358,556

INFUSER

Joseph Block, New York, N. Y., assignor to J. & I. Block, New York, N. Y., a partnership composed of Irving Block, Dorothy Block, and Joseph Block Application March 10, 1943, Serial No. 478,630

1 Claim. (Cl. 99—306)

The present invention relates to infusers, and is more particularly directed toward infusers suitable for making a single cup of coffee.

Drip coffee makers are customarily made in sizes suitable for making at least two cup of coffee and the more common sizes are suitable for making four or more cups of coffee. In the usual drip coffee maker of multiple cup size the quantity of water used is such that the temperatures are kept sufficiently high during the time necessary for preparing the coffee extract. During the preparation of coffee extract by the drip method there is usually an initial rush of water through the dry and loose grindings and the filter to make only a weak extract, and this initial flow is followed by a slower flow of water through the wet and swollen grindings which makes a stronger or more concentrated extract, the latter being mixed with the earlier extract to produce the extract of the desired strength.

The difficulty usually present when an attempt has been made to produce a single cup of coffee by the drip method is that too large a portion of the water runs through in the initial rush and the beverage is entirely too weak, or all the water is held back so long that it cools and does not properly extract the grindings.

The present invention contemplates a drip coffee maker suitable for a single cup of coffee in which the time required for the flow of the cup of water through the small quantity of grindings required is such as to make an extract of the proper strength in a period of time which results in producing a hot cup of coffee.

The present invention contemplates a drip coffee maker suitable for use directly on top of the coffee cup so that there is no loss of heat while transferring the coffee from the container in which it is made to the cup from which it is to be drunk, and it is so designed as to avoid spillage of coffee into the saucer.

The accompanying drawing shows, for purposes of illustrating the present invention, an embodiment in which the invention may take form, it being understood that the drawing is illustrative of the invention rather than limiting the same.

In the drawing:

Figure 1 is a view through the coffee maker showing it in position on top of a conventional cup and saucer;

Figure 2 is a top plan view of the same;

Figure 3 is an elevational view of the filter and filter holder with parts broken away to show the holder;

Figure 4 is a sectional view on the line 4—4; and

Figure 5 is a fragmentary sectional view at an enlarged scale.

The coffee maker shown herein includes a container 10 of a size sufficient to receive a cup of fluid. It has downwardly sloping walls, as indicated at 11, a bottom flange 12 whereby it may be rested on top of the coffee cup 13. It has a depending flange or bead 14 of somewhat smaller diameter than the inside diameter of the top of a cup which keeps the container from sliding off the cup and forms a drip edge. The body 10 also has an inwardly extending flange at 15 to rest on the top of the cup, and a large central opening 16. This body member may be made of porcelain, glass, or similar material of poor heat conductivity and may be readily preheated, if desired.

A disc-like member 20 also made of glass, porcelain, or similar material which will stand the temperature of boiling water is of a size somewhat larger than the opening 16, so that it can be rested on the flange 15. This disc-like member is received in a bag 21 of suitable close-meshed fabric provided with a draw-string indicated at 22, whereby it may be drawn tightly around the disc. The disc is provided with an irregular outer periphery, as indicated more clearly in Figure 3. This irregular outer periphery is formed by providing the body of the disc with hemispherical projections 23 and 24, the projections 23 being of larger diameter than the projections 24. Grooves 25 radiate back between these projections. These grooves, together with the notches between the projections, provide small capillary passages which regulate the flow of the water in making the infusion. It flows down on the upper face of the disc and passes to the lower face where it can readily find its way down through the fabric. The fabric rests on the flange of the body of the coffee maker, so that all the liquid must be filtered before it can pass down into the cup. It flows down onto the drip forming flange 14 and does not run out over the top of the cup.

A drip coffee maker such as illustrated herein can be made in an inexpensive manner and readily used by an individual desiring to make a cup of coffee. It is merely necessary to place the necessary amount of grindings on the filter and pour through the hot water. The filter cloth may be used a great many times before discarding it. The time required for the water to flow through will be in the order of 2½ minutes sufficient to make a satisfactory cup of drip coffee and yet not have the product delivered at too low a temperature.

Since it is obvious that the invention may be embodied in other forms and constructions within the scope of the claim, I wish it to be understood that the particular form shown is but one of these forms, and various modifications and changes being possible, I do not otherwise limit myself in any way with respect thereto.

What is claimed is:

A coffee infuser comprising a container having a narrow inner flange at the bottom to form a large central hole and support a closure for the hole, and an external flange whereby the container may be rested on a coffee cup or the like, and a filter comprising a substantially imperforate disc, a fabric bag having a draw-string for constricting the bag to fit tightly about the disc, the disc having radial ridges on its upper surface and peripheral ridges all of which keep the fabric out of intimate contact with the grooves intermediate the ridges, the ridges and fabric forming capillary passages for drainage of the liquid, the bag retarding the flow to provide time for forming the infusion.

JOSEPH BLOCK.